United States Patent [19]

Simanski

[11] Patent Number: 4,679,482
[45] Date of Patent: Jul. 14, 1987

[54] PIANO KEYBOARD SHIELD

[76] Inventor: Edward G. Simanski, 3005 Spruce Ave., Altoona, Pa. 16601

[21] Appl. No.: 757,883

[22] Filed: Jul. 23, 1985

Related U.S. Application Data

[60] Continuation-in-part of Ser. No. 521,066, Aug. 8, 1983, which is a division of Ser. No. 385,509, Jun. 7, 1982, Pat. No. 4,419,921.

[51] Int. Cl.$^4$ .............................................. G09B 15/06
[52] U.S. Cl. ........................................................... 84/467
[58] Field of Search .......................................... 84/467

[56] References Cited

U.S. PATENT DOCUMENTS 4,419,921  12/1983  Simanski .............................. 84/467

FOREIGN PATENT DOCUMENTS 938672  2/1956  Fed. Rep. of Germany ...... 400/714

Primary Examiner—Lawrence R. Franklin
Attorney, Agent, or Firm—Weiser & Stapler

[57] ABSTRACT

A keyboard shield adapted to be attached to a piano of the type having a laterally extending gap, or slot in a vertical section located at the rear of the keyboard. The shield includes a rear section engageable within the slot for attaching the shield to the piano, and a cover portion adapted to interrupt a player's line of vision to at least a portion of the keyboard when the shield is so attached.

12 Claims, 6 Drawing Figures

PIANO KEYBOARD SHIELD

RELATED CASES

This application is a continuation-in-part of prior co-pending U.S. patent application Ser. No. 521,066, filed Aug. 8, 1983; which is itself a divisional of prior co-pending U.S. patent application Ser. No. 385,509, filed June 7, 1982, now U.S. Pat. No. 4,419,921, dated Dec. 13, 1983.

FIELD OF THE INVENTION

This invention relates generally to a piano keyboard shield for interrupting a player's line of vision to at least a portion of the keyboard.

BACKGROUND ART

A person intitially learning to play the piano should be encouraged not to watch the keyboard when playing. Rather, he should be taught to learn the location of the various keys by touch, similar to the approach used in teaching typing. Once the individual becomes comfortable with his knowledge of the key locations, he will be able to focus virtually all his visual attention on reading the music.

U.S. Pat. No. 2,298,799, issued to McClintock, teaches one type of keyboard cover for obstructing a player's line of sight to at least a portion of the keyboard. This provides an artificial aid to force the learner to rely upon the touch system in locating keys, since he is unable to actually see the keys through the overlying cover. In the McClintock structure a shelf 14, formed of a bent piece of fiberboard, overlies the keys to obstruct the player's line of sight thereto. The shelf is held in position by bracket-like supports 18 which fit in the narrow gaps between the piano keys and rest on the substructure beneath the keys. Each of the supports 18 includes a notch 28 to provide clearance for the hands and fingers of the player. However, each of the bracket-like supports 18 can frictionally interfere with the operation of the piano key adjacent to it.

DISCLOSURE OF THE INVENTION

It is therefore the principal object of this invention to provide a piano keyboard shield which is conveniently attachable to a piano without interfering with operation of the piano's keys.

This and other objects are achieved in accordance with this invention by providing a keyboard shield which is adapted to be attached to a piano having a laterally extending gap or slot in a vertical section located at the rear of the keyboard. The shield includes a rear section engageable within the slot for attaching the shield to the piano, and a cover portion which is capable of interrupting a player's line of vision to at least a portion of the keyboard.

The above-described arrangement avoids the necessity of positioning any elements of the shield in the narrow gaps between the keys of the keyboard. Thus, the keyboard shield of this invention does not interfere, in any way, with the operation of any of the keys when an individual is playing the piano.

Throughout this application, all references to the position and/or orientation of the various sections of the shield will refer to the positions and/or orientations occupied by these sections when the shield is attached to the piano.

In a preferred embodiment of this invention the rear section is inclined upwardly and rearwardly, and is generally thinner than the thickness of the laterally extending gap or slot in the vertical section at the rear of the keyboard. This dimensional relationship permits the rear section of the shield to be inserted into the slot without frictionally rubbing against, and possibly damaging, wood surfaces of the piano.

The cover portion of the shield preferably includes an upwardly and forwardly inclined intermediate section constituting a continuous extension of the rear section, and forming a laterally extending edge at its junction with said rear section. A horizontal, substantially planar front section forms a continuous extension of the intermediate section and provides sufficient clearance above the keyboard for accommodating the hands and fingers of the player. The laterally extending edge joining the rear section of the shield to the intermediate section, when the shield is connected to the piano, engages a lower surface of the laterally extending slot, and the rear section of the shield is biased into engagement with the rear edge of the upper surface of said slot.

Most preferably, the rear section and the cover section are laterally continuous and coextensive with one another, and with the piano's keyboard, to appropriately cover all of the keys. The rear section and the cover section are advantageously joined together by a hinging mechanism, to enable the mutual adjustment of these structural elements to accommodate different piano designs.

Further detail regarding piano keyboard shield constructions in accordance with this invention may be had by referring to the description of the Best Mode of the Invention, taken in conjunction with the following drawings.

BRIEF DESCRIPTION OF THE DRAWINGS

In the several views provided, like reference numbers denote similar structure.

BEST MODE OF THE INVENTION

Figures 1, 2:
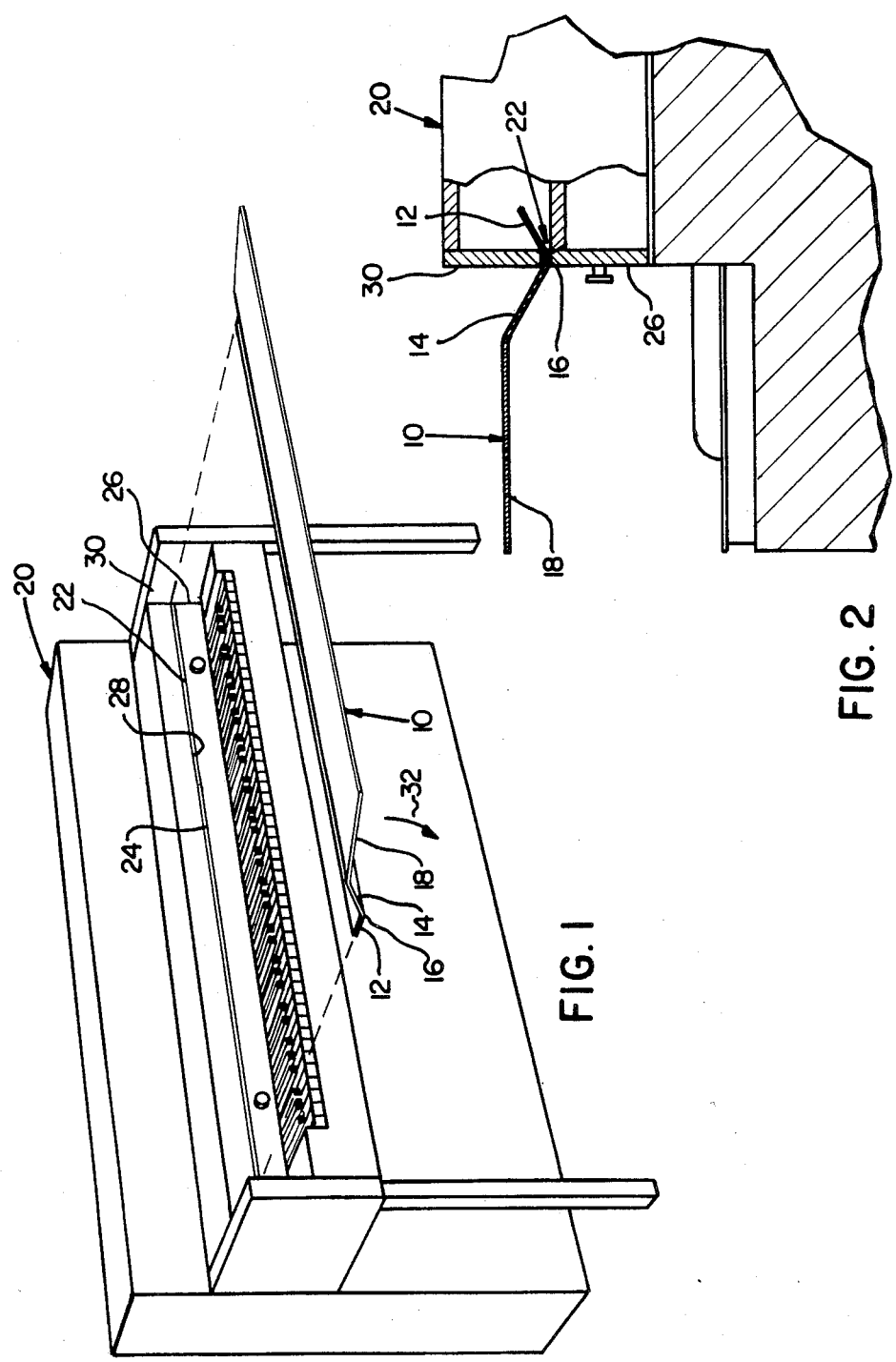
FIG. 1 is an exploded isometric view showing an alternative embodiment keyboard shield of this invention separated from the piano to which it is to be attached, but oriented in a position for easy attachment thereto.
FIG. 2 is a sectional view showing the shield of FIG. 1 attached to the piano.
Figure 3:
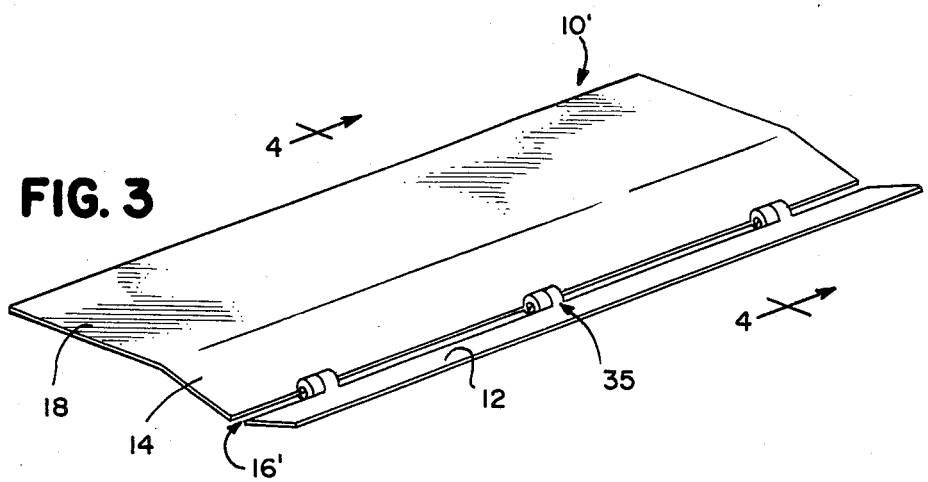
FIG. 3 is an isometric view of another alternative embodiment keyboard shield of this invention.
Figure 4:
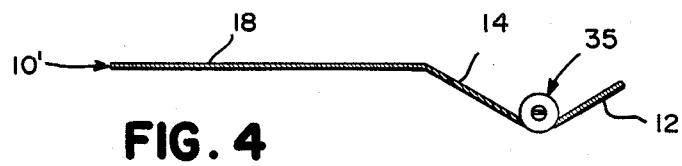
FIG. 4 is a sectional view taken along line 4—4 of FIG. 3.
Figure 5:
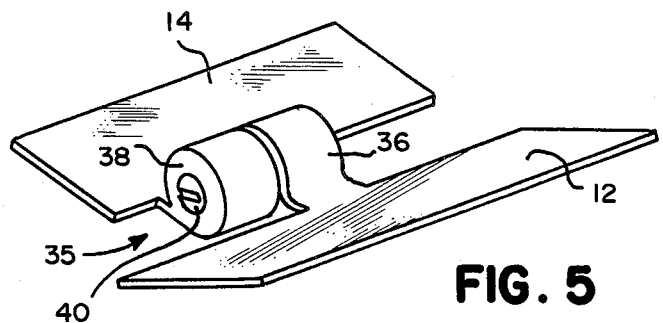
FIGS. 5 and 6 are enlarged, partial isometric views of hinges for attaching together the rear section and the cover section of the keyboard shield of FIG. 3.
Figure 6:
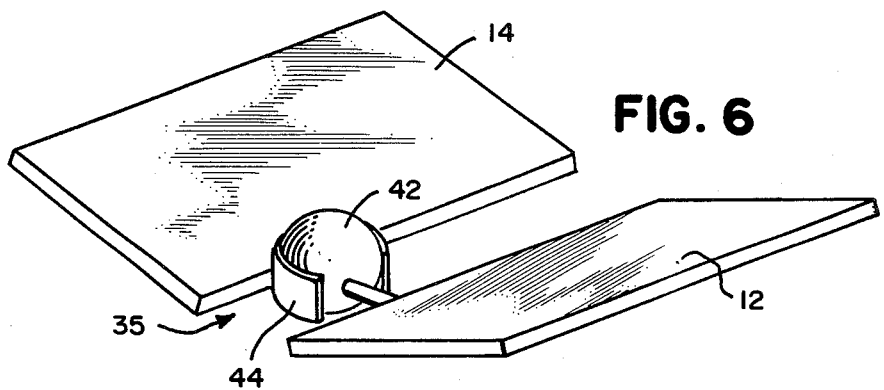

Although specific forms of the invention have been selected for illustration in the drawings, and the following description is drawn in specific terms for the purpose of describing these forms of the invention, this description is not intended to limit the scope of the invention which is defined in the appended claims.

Referring to the drawings, the unitary keyboard shield 10 of this invention preferably is formed of a plastic material, such as acrylic. The shield 10 generally includes an upwardly and rearwardly inclined, substantially flat rear lip section 12 joined to an upwardly and forwardly inclined intermediate section 14 so as to develop a laterally extending junction at 16. A substantially horizontal, planar front section 18 forms a continuous extension of the inclined intermediate section 14, and with the intermediate section, constitutes a cover portion adapted to overlie at least a portion of the piano keyboard for interrupting a player's line of sight to the keys.

The keyboard shield 10 of this invention is adapted to be employed with a piano 20 of the type including a slot, or gap 22 located in a vertical section, or backboard at the rear of the keyboard. In the illustrated embodiment, this slot 22 is the space provided between the upper wall 24 of a slidable lid 26 employed to cover the keys when the piano is not in use, and a vertically spaced, lower wall 28 of an adjacent, vertical panel 30.

Referring specifically to FIG. 1, the keyboard shield 10 is shown in its desired orientation for insertion into the slot 22. Specifically, the rear lip section 12 is positioned so that it lies in substantially the same plane as the slot 22. This lip is then inserted into the slot until the lateral junction 16 prevents further inward motion. Thereafter the shield is rotated gently in the direction of arrow 32 to cause the laterally extending junction 16 to slide into engagement with the upper wall 24 of the lid 26, and thereby occupy the position illustrated in FIG. 2. In the preferred embodiment of this invention the rear lip section 12 is thinner than the slot 22 to avoid damaging the wood surfaces defining the slot as the shield is being attached to the piano.

Note that the moment created by the intermediate and front sections 14 and 18 also is in the direction of arrow 32, and this moment tends to force the inclined lip section 12 into a position overlying and engaging the rear edge of the panel 30 to thereby establish a firm, yet removable attachment to the piano. Most preferably the rear lip section 12 and inclined intermediate section 14 provide a substantially V-shaped configuration, in cross-section, that closely bridges, or embraces the vertical panel 30. This provides an extremely stable connection to the piano.

The shield 10 can be easily removed from the piano by merely rotating it in a direction opposite to arrow 32. This will cause the lower lateral junction 16 to slide forwardly, out of engagement with the upper wall 24 of lid 26. Thereafter, the lip section 12 can be slid out of the slot 22 quite easily.

With reference to FIGS. 1 and 2 of the drawings, there is shown a first alternative embodiment piano shield 10 wherein the rear lip section 12 is joined to the intermediate section 14 along a unitary junction 16. Thus, the shield 10 can be fabricated easily by cutting a substantially planar sheet of acrylic, and then molding it into the desired shape by the application of heat. This results in the manufacture of a unitary shield having a rear lip section 12, an intermediate section 14 and a front section 18 which are essentially coextensive with one another. Preferably, the resulting shield has a length which is approximately the same as that of the keyboard, to assure complete coverage of the keys.

It is important that the clearance between the shield 10 and the front end of the keyboard be sufficient to accommodate the player's hands without interference. In accordance with this invention the particular slope and/or length of the intermediate section 14 will determine the clearance between the front end of the keyboard and the horizontal front section 18 of the shield. Most preferably, the slope of the intermediate section 14 is chosen so that the V-shaped, cross-sectional configuration between the intermediate section 14 and the rear lip section 12 closely confines the vertical panel 30. The particular location of the gap, or slot 22 relative to the upper surface of the keys actually will dictate the vertical spacing that is required between the lateral junction 16 and the front section 18 of the shield for establishing the desired clearance. This, in turn, is controlled by the slope and/or length of the intermediate section 14.

Although the foregoing considerations are well accommodated by the unitary shield 10 illustrated in FIGS. 1 and 2, this generally necessitates the manufacture of such shields in different sizes and shapes which are properly suited to each of the variety of pianos which are presently commercially available. To substantially eliminate this need, at the cost of a slightly more expensive product, an alternative embodiment piano shield 10' such as in shown in FIGS. 3 to 6 can be provided, wherein the rear lip section 12 is joined to the intermediate section 14 by means of an adjustable junction 16'.

FIGS. 3 to 6 illustrate two such adjustable junctions 16', each of which is generally comprised of a series of hinge elements 35 spaced at appropriate intervals along the junction 16'. In the embodiment illustrated in FIGS. 3 to 5, each hinge element 35 includes a cylindrical member 36 joined to the rear lip section 12, a cylindrical member 38 joined to the intermediate section 14, and a screw 40 for retaining the members 36 and 38 together and in frictional contact with one another. In the embodiment illustrated in FIG. 6, each hinge element 35 includes a ball member 42 joined to the rear lip section 12 and a cooperating socket member 44 joined to the intermediate section 14. In either case, frictional engagement developed at the hinge elements 35 enables adjustment of the angle between the rear lip section 12 and the intermediate section 14, thereby accommodating different piano designs and constructions.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A keyboard shield adapted to be attached to a piano of the type having a laterally extending gap or slot in a vertical section located at the rear of the keyboard, said shield, when attached to the piano, including a cover section interrupting a player's line of vision to at least a portion of said keyboard, the improvement wherein said shield includes a rear section engageable within said slot for attaching the shield to the piano, said rear section being continuous laterally and connected to said cover section by a hinge.

2. The keyboard shield of claim 1 wherein said shield is formed from an original rectangular sheet.

3. The keyboard shield of claim 1 wherein the rear section is substantially planar, and thinner than said slot.

4. The keyboard shield of claim 1 wherein the rear section is substantially planar, and inclined upwardly from the plane of the cover section by less than about 90 degrees.

5. The keyboard shield of claim 1 wherein said rear section and said cover section are joined in unitary combination.

6. The keyboard shield of claim 1 wherein the rear section is approximately the same length as the cover section and said keyboard.

7. The keyboard shield of claim 1 wherein said hinge places said rear section and said cover section in frictional engagement with one another.

8. The keyboard shield of claim 7 wherein said hinge comprises a pair of cylindrical members respectively attached to said rear section and said cover section, and connected together by a screw.

9. The keyboard shield of claim 7 wherein said hinge comprises ball and socket members respectively attached to said rear section and said cover section.

10. The combination of a keyboard shield and a piano of the type having a laterally extending gap or slot in a vertical section located at the rear of the keyboard, said shield having a rear section engaged within said slot and a cover section overlying the keyboard for interrupting a player's line of vision to at least a portion of said keyboard, said rear section being continuous laterally and connected to said cover section by a hinge.

11. The combination of claim 10 wherein the rear section is substantially planar, and thinner than said slot.

12. The combination of claim 10 wherein the rear section is approximately the same length as the cover section and said keyboard.

* * * * *